Oct. 18, 1927.
W. G. WILSON
GATE VALVE
Filed Jan. 6, 1926
1,645,785
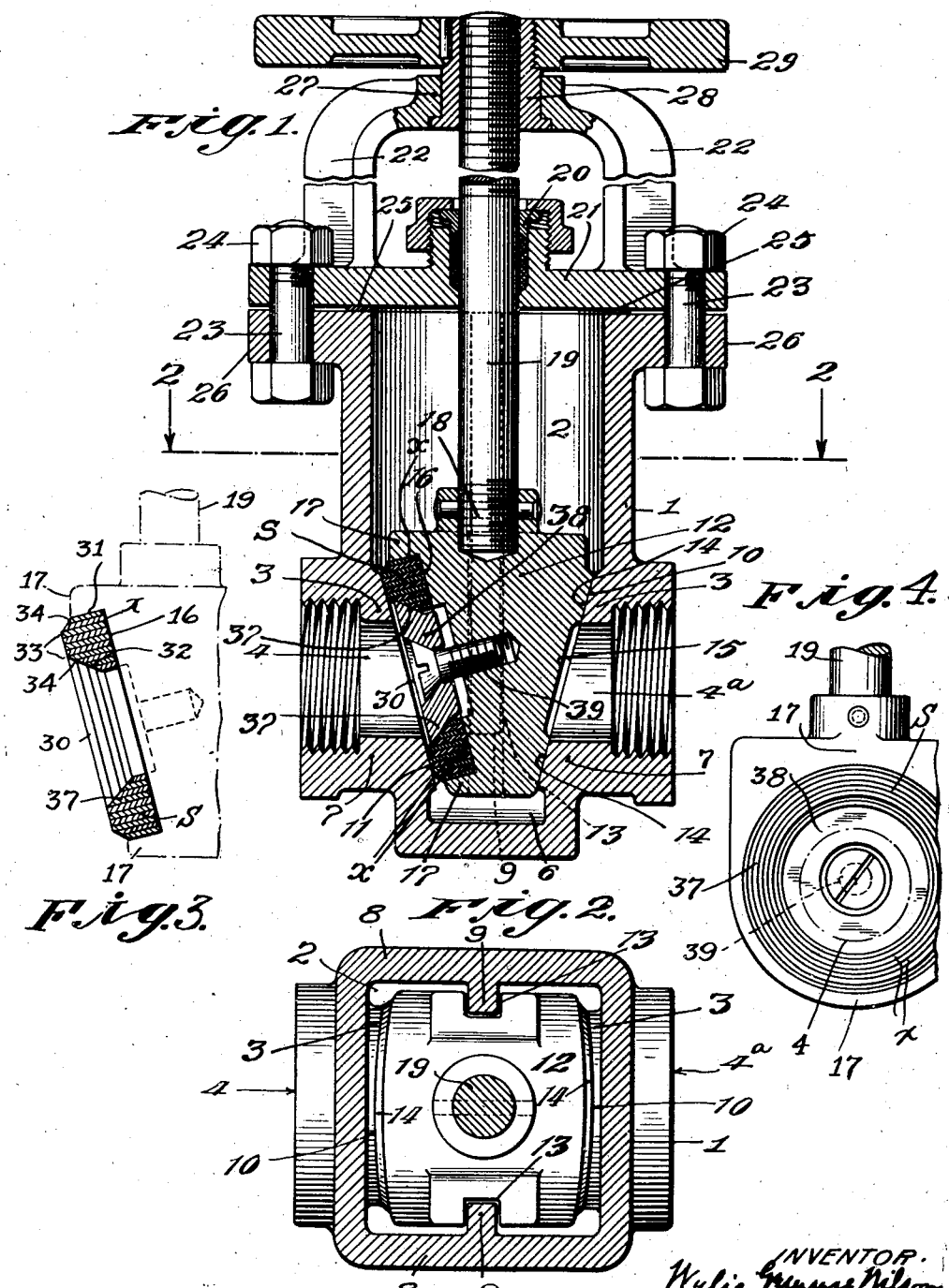
INVENTOR.
Wylie Gwynne Wilson
BY
ATTORNEY Patented Oct. 18, 1927.

1,645,785

UNITED STATES PATENT OFFICE.

WYLIE GEMMEL WILSON, OF ELIZABETH, NEW JERSEY.

GATE VALVE.

Application filed January 6, 1926. Serial No. 79,572.

This invention relates to improvements in gate valves. Its object is to produce a gate valve in which the packing or sealing ring is better adapted than heretofore to form a non-leaking valve under the high pressures and velocities of fluids passing through valves according to present technical requirements and to prevent the sealing or packing ring from becoming torn or frayed in operation.

In the accompanying drawings forming a part hereof and illustrating the invention in the best form now known to me, Fig. 1 is a vertical central section of my new gate valve; and Fig. 2 is a transverse, sectional and plan view looking down at line 2—2 of Fig. 1.

Fig. 3 is a section through a wall of the sealing ring.

Fig. 4 is an elevation of that face of the wedge shaped carrier on which the sealing ring is positioned and shows the sealing ring and in dotted lines the position of the port in relation to the sealing ring when the valve is in the closed position.

In the drawings, the upper portion 1 of the under casing has a chamber 2 for reception of the gate valve when lifted. The chamber is formed with horizontal, opposed, spaced apart wall portions 3, through which the transverse, alined ports 4 and 4ª are formed. The bottom of the under portion of the casing is recessed on its upper side at 6. The under wall portion 7 of the casing forms the under walls of the ports 4 and 4ª. The opposed side portions 8 of the casing, parallel to the opposed ports 4 and 4ª, are provided with vertical guide ribs 9. The wall portions 3 and 7 are alined and formed with flat, downwardly convergent, tapered walls 10 and 11, the wall 10 enclosing one port and the wall 11 enclosing the other port. The other opposite sides 8 of the wedge shaped packing ring carrier 12, parallel to the ports 4 and 4ª, have recesses 13 for reception of the guide ribs 9, the packing ring carrier having four sides and the portion of the casing chamber in which the walls 10 and 11 are formed also having four sides, in the present form of the invention. The intake port is indicated by 4, the discharge port by 4ª.

On its tapered side opposed to the wall 10, the carrier has a circular wall 14 having a recess 15 which is opposed to the discharge port 4ª.

The packing ring receiving wall of the carrier is formed with a packing ring receiving recess 16 of cup form and the side wall of the cup is indicated by 17. The bottom wall of the cup is downwardly and inwardly slanted. A sealing or packing ring is mounted in this cup and has a projecting sealing surface for contact with the circular wall 11.

The upper end of carrier 12 has connected with it at 18 the under end of an upwardly extending spindle 19 which passes through a stuffing box 20 mounted on the transverse bottom plate 21 of an upstanding bracket 22. Plate 21 forms the cover for chamber 2 and is clamped to the under casing by bolts 23 and nuts 24 in a well known manner. A gasket 25 is interposed between the plate 21 and the flange 26 of casing 1, through which bolts pass upwardly through a margin of the plate 21. The top portion of the bracket is constructed in a well known manner at 27 for reception of the upper end of spindle 19, the upper end of which is in threaded connection with a thimble 28 provided with a hand wheel 29.

The sealing or packing ring S is made up of asbestos laminæ $x$ compressed or compacted and united together, usually by vulcanization. This ring or annulus is made dense and stiff by the compression of the united laminæ and yet is slightly elastic and very slightly compressible. It substantially retains its form under pressure. Being made of united layers, it must be kept compressed and supported while in use, because it softens to a considerable but variable extent when subjected to steam or other fluid under pressure, the edges of the laminæ and the sealing surface then tending to separate to a greater or less degree, as is usual with prior asbestos packing rings made of a strip wound upon itself and having flat, parallel faces, one of which flat faces forms a sealing surface.

The ring has a central opening 30 forming a recess at the front of the clamping and compression plate 38; opposed, clampable walls 31 and 32; and on its sealing face side, a sealing surface 33 which is between backwardly tapered portions 34, each tapered portion 34 being between the sealing surface 33 and the clampable wall 31 or 32. The sealing surface is formed of edges of the united laminæ which in use contact with the tapered face of the circular or annular wall 11. While these tapered edges perform no direct function in use, they definitely serve as supports one for the other and for the intermediate laminæ and also serve as spacers to hold the sealing surface apart from the annular cup wall 17 and from the backwardly tapered peripheral wall 37 of the ring clamping and compression plate 38 which is fixed to the carrier by a screw 39 through a central opening in the clamping and compression plate.

The carrier 12 being wedge shaped on its back and ring carrying, front side, is guided in its reciprocations by the ribs 9 and recesses 13, when the hand wheel 29 is rotated. The sealing face of the packing ring, as it is brought into seating position and as it is initially lifted, wipes against the wall 11 which forms the valve seat. The recess 6 receives the under end of the carrier 12 when the valve is seated. The interior diameter of the sealing or packing ring, projects towards wall 11 beyond the face of the clamping and compression plate and beyond the edges of the side wall of the cup, this projecting portion having an interior diameter considerably and substantially greater than the diameter of the adjacent port 4.

The effect is that when there is a relative wiping action between the actual sealing surfaces as they are moved into or out of sealing position, the sealing edges of the windings in the sealing face are not torn, frayed or disrupted by the frictionized movements to which they are then subjected because they are supported by the exterior and interior adjacent laminæ which afford them in conjunction with the rigid members, unfrictionized support, such exterior and interior laminæ exposed exteriorly and interiorly around the sealing face being free from frictionized rubbing.

By this invention also the sealing face of the packing ring has an interior diameter substantially greater than the diameter of the adjacent port wall and in sealing position the contacting sealing surfaces are spaced apart from the entrant corner portion of the adjacent sealed port. It is exceedingly important when the valve is first put into service, that this condition exist. After the valve has been operated many times and the packing ring thus subject to continual compression with resultant increased density of the packing ring, it is not harmful if the edge of the packing ring, due to wearing down of the surface of the packing ring, finally slightly pass the edge of the port at the moment of final seating, because at this time the surface of the packing ring has become definitely hardened and the whole packing ring so compacted that protrusion of the packing ring into the port, due to the pressure put upon it by the wedge action of the carrier does not occur prejudicially. But when first put into service, it is very important that the interior peripheral front margin of the sealing surface of the packing ring should not become opposed to the adjacent port while in seated position, because in that case such margin would be protruded into the port and on an unseating movement the protruded portion of the sealing ring would be brought into contact with the peripheral back corner of the port wall and the windings torn.

In the same way, on seating movement, any protrusion of the packing ring into the port on the bottom corner portion of the inner arcuate edge of the bottom portion would similarly tear or disrupt the packing ring laminæ. It is only necessary that the upper and under arcs of the packing ring form a recess longer than the vertical axis of the port, because it is in a sliding movement across the port that the disruption of the winding occurs.

The cross sections of the intake and outlet ports may be varied in shape and the form of apparatus in which this invention is embodied may be varied.

An important object of this sealing ring construction is to permit the sealing ring to be moved across a port for opening or closing it without tearing the edges of the windings in the actual sealing face. But in this particular application, it is not to be understood that my invention is necessarily limited to a packing ring of wound, precompressed asbestos material. It is only essential that under all conditions the cross sectional area of the port immediately adjacent the packing ring must be less than the opposed recess on the front face of the packing ring.

The packing ring itself is not herein claimed because it forms the subject matter of my pending application Ser. No. 79,568, filed Jan. 6, 1926.

Wear on edges of the windings or laminæ in the sealing ring merely wears down the width of the layer but does not destroy it; and edge contact of the sealing ring laminæ with the metallic valve seat is of the highest importance in securing and maintaining tight joints of the seated elements.

In order to produce the simplest kind of gate valve, it is necessary that the front and back walls of the wedge shaped carrier be equally inclined to the axis of the spindle, the carrier being then formed as a wedge which fits with reasonable exactitude between the opposed sloping faces 10 and 11 of the casing. With this construction, the wedge shaped carrier travels always in a straight line as each of the sloping faces has the same angle and consequently, each of them equally pushes the wedge shaped corner toward the axis of the spindle, when wedge is moved into place. It is very desirable that only one of the faces of the wedge should have a packing because it is desirable to have as little downward movement of the wedge shaped carrier after contact is once established between the face on the wedge and the corresponding tapering face on the casing, as is possible, for two reasons:—first, to reduce the rubbing wear on the packing face, and:—second, to obtain the maximum number of such compressions of the ring or packing face as occur in closing the valve, and produce impacting of the packing face with consequent ability of the wedge to move further down, before the upper edge of the recess at 30 travels sufficiently far down to coincide with the upper edge of the port 4. The upper edge of the recess is the inner edge of the upper portion of the sealing face.

It has hitherto been customary in gate valves to make each side of the wedge a sealing face, in the vain hope of thus obtaining a leak-tight seal.

Such double sealing effect is wholly unnecessary in my gate valve because the single sealing face of packing with the recess over the port forms an absolutely effective, leak-tight seal and consequently no additional seal is necessary.

The metallic faces 10 and 13 at the back side of the wedge do incidentally form a seal to a certain degree, but very soon, due to cutting and grooving from movement of the faces under pressure from each other, such seal becomes practically inoperative.

As a result of my invention, while there are two sloping faces in the casing and two sloping faces of the carrier corresponding therewith, yet the sealing ring of packing is only at one of the ports in the port casing and a gate valve is obtainable that has successfully withstood numerous heavy discharge tests.

While the present invention is shown embodied in a gate valve and some of the appended claims are restricted to a gate valve, the improvement of which is an object of the present invention, yet more broadly considered, features of my invention may be embodied in valves of the class or classes not included in gate or slide valves.

While the sealing ring and the port are both shown circular, as is generally the case, the circular form is not essential. As the sealing face wears down through use, the wedge shaped carrier travels further across the port before it reaches the final sealing position, in consequence of reduction in the thickness of the ring. This further travel makes the lower edge of the recess of the sealing ring travel further away from the lower edge of the port and the upper edge of the recess travel downwardly nearer the upper edge of the port. Consequently, the upper edge of the recess is spaced apart from the upper edge of the port, further than the lower edge of the recess is spaced from the lower edge of the port, when the sealing ring is in final sealing position. The change in the relative positions of these edges is thus compensated for so that with a minimum size of ring, a maximum number of sealing operations may occur before, due to wear as described, the upper edge of the recess coincides with the upper edge of the port. As a consequence of this it is obvious that the center of the distance from the upper edge of the recess to the lower edge of the recess, measured on the line of travel, stops short of the center of a similar dimension of the port when the valve is first made, and even after considerable use. In general practice, the distance by which the sealing face of the sealing element extends beyond a port which it seals is commonly referred to as lap or overlap; but in the present case I thus refer to the amount by which the recess plus the sealing face of the sealing element extends beyond the edge of the port when the sealing element is in a closed position.

The immediately foregoing matter is illustrated by Fig. 4.

The practical importance of this invention has been demonstrated by the following facts.

With its metal face and sealing ring of the precise form herein shown, and the sealing ring being of dense, non-metallic and but slightly compressible material, the valve, under steam at sixty pounds pressure was absolutely leak tight after over four thousand operations and was leak tight after each separate operation; whereas, when the same valve structure was modified by substitution for its aforesaid sealing ring of a sealing ring of the same materal, but having an interior diameter slightly less than the diameter of the port and held in place by a clamping and compression plate of lesser face diameter than the diameter of the port, the valve leaked after a very few operations under said steam pressure of sixty pounds.

I have purchased in the market and have tested the best known gate valves of different makes, under sixty pounds steam pressure and none of them proved leak tight after fifty operations, most of the them leaking after ten operations. It will be observed that the face of my clamping and compression plate 37 has a considerably greater diameter than the sealing wall 11 surrounding the port, the front outer margin of the plate overlapping the sealing wall 11. Thus, the clamping and compression plate serves to prevent projection of any part of the sealing ring into the port, during operating movements, when the carrier 12 is under steam or other fluid pressure through port 4ª for pressing the sealing surfaces or elements into sealing contact. The present invention may be regarded as in the nature of an improvement on the straightway valve shown in Jenkins' United States Patent #587,439 of Aug. 3, 1897.

As plainly shown in Fig. 1, the recess in the front of the sealing ring has, relatively to the port 4 and its enclosing sealing wall 11, an overlapping relation that is nearly twice as great at the upper portion of the sealing wall 11 as it is at the under portion of said wall, such greater overlapping occurring at the point or place where the sealing ring, while moving to closed position, first overlaps the sealing wall around the port. This condition is effective to prolong the working life of the valve; and for brevity, that portion of the sealing ring that has the greater overlap may be called the sealing ring heel and that portion of the sealing ring which has the lesser overlap may be called the sealing ring toe. The sealing ring carrier may also be termed a valve head.

What I claim is:

1. In a valve, the combination with a valve casing having opposed ports each enclosed by a flat, inclined valve seat wall, of a wedge shaped sealing ring carrier having a sealing ring receiving recess formed with a side wall of uniform diameter; a precompacted sealing ring having a slightly elastic sealing face and a main body portion dimensioned to make a close initial fit with said wall; a rigid, bevelled edge clamping plate and means for fastening it in place; the clamping plate having a diameter substantially exceeding the diameter of one of said ports and overlapping the valve seat wall around said one port when the valve is closed, such latter valve seat wall having an exterior diameter substantially greater than the diameter of the plate and also than the outside diameter of the sealing ring face; the sealing ring projecting forwardly of the carrier and the clamping plate, and having exterior and interior tapered, corner portions between which the elastic sealing face is formed; and carrier operating means effective to move said sealing ring face into opposition to said latter valve seat wall with the clamping plate margin opposed thereto; said carrier operating means being also effective to wedge the sealing face against said latter valve seat wall, whereby no part of the sealing face is projectable into the port and whereby, on joint forming compression of the sealing face against said latter valve seat wall, the outer tapered corner portion of the ring is not compressible into a disintegratable fin between the carrier and the outward margin of said latter valve seat wall.

2. In a valve, the combination with a valve casing having opposed ports each enclosed by a flat, inclined valve seat wall, of a wedge shaped sealing ring carrier having a sealing ring receiving recess formed with a side wall for contact with a portion of the periphery of a sealing ring; a precompacted sealing ring having a slightly elastic sealing face and a main body portion dimensioned to make a close initial fit with said wall; a rigid, bevelled edge clamping plate and means for fastening it in place; the clamping plate having a diameter substantially exceeding the diameter of one of said ports and overlapping the valve seat wall around said one port when the valve is closed, such latter valve seat wall having an exterior diameter substantially greater than the diameter of the plate and also than the outside diameter of the sealing ring face; the sealing ring projecting forwardly of the carrier and the clamping plate, and having exterior and interior tapered, corner portions between which the elastic sealing face is formed; and carrier operating means effective to move said sealing ring face into opposition to said latter valve seat wall with the clamping plate margin opposed thereto; said carrier operating means being also effective to wedge the sealing face against said latter valve seat wall, whereby no part of the sealing face is projectable into the port and whereby, on joint forming compression of the sealing face against said latter valve seat wall, the outer tapered corner portion of the ring is not compressible into a disintegratable fin between the carrier and the outer margin of said latter valve seat wall.

3. In a valve, the combination with a valve casing having opposed ports, each port having adjacent thereto, a rigid face, and one of the ports being enclosed by said rigid face and said rigid face being a flat, inclined, valve seat wall, of a wedge shaped sealing ring carrier having a sealing ring receiving recess formed with a side wall for contact with a portion of the periphery of a sealing ring; a precompacted sealing ring having a slightly elastic sealing face and a main body portion dimensioned to make a close initial fit with said wall; a rigid, bevelled edge clamping plate and means for fastening it in place; the clamping plate having a diameter substantially exceeding the diameter of one of said ports and overlapping the valve seat wall around said one port when the valve is closed, such latter valve seat wall having an exterior diameter substantially greater than the diameter of the plate and also than the outside diameter of the sealing ring face; the sealing ring projecting forwardly of the carrier and the clamping plate, and having exterior and interior tapered, corner portions between which the elastic sealing face is formed; and carrier operating means effective to move said sealing ring face into opposition to said latter valve seat wall with the clamping plate margin opposed thereto; said carrier operating means being also effective to wedge the sealing face against said latter valve seat wall, whereby no part of the sealing face is projectable into the port and whereby, on joint forming compression of the sealing face against said latter valve seat wall, the outer tapered corner portion of the ring is not compressible into a disintegratable fin between the carrier and the outward margin of said latter valve seat wall.

4. In a valve, the combination with a valve casing having opposed ports, one of which is enclosed by a flat, inclined, valve seat wall, of a wedge shaped sealing ring carrier having a sealing ring receiving recess formed with a side wall for contact with a portion of the periphery of a sealing ring; a precompacted sealing ring having a slightly elastic sealing face and a main body portion dimensioned to make a close initial fit with said wall; a rigid, bevelled edge clamping plate and means for fastening it in place; the clamping plate having a diameter substantially exceeding the diameter of one of said ports and overlapping the valve seat wall around said one port when the valve is closed, such latter valve seat wall having an exterior diameter substantially greater than the diameter of the plate and also than the outside diameter of the sealing ring face; the sealing ring projecting forwardly of the carrier and the clamping plate, and having exterior and interior tapered, corner portions between which the elastic sealing face is formed; and carrier operating means effective to move said sealing ring face in opposition to said latter valve seat wall with the clamping plate margin opposed thereto; said carrier operating means being also effective to wedge the sealing face against said latter valve seat wall, whereby no part of the sealing face is projectable into the port and whereby, on joint forming compression of the sealing face against said latter valve seat wall, the outer tapered corner portion of the ring is not compressible into a disintegratable fin between the carrier and the outward margin of said latter valve seat wall.

Signed at New York in the county of New York and State of New York this 23d day of December, A. D. 1925.

WYLIE GEMMEL WILSON.